United States Patent
Hansen et al.

(10) Patent No.: US 12,182,586 B1
(45) Date of Patent: Dec. 31, 2024

(54) SYSTEM AND METHOD FOR MICROLOCATION-BASED WITH TOKENIZED VIRTUAL DYNAMIC SOFTWARE APPLICATIONS (APP) EXPERIENCES

(71) Applicant: UIPCO, LLC, San Antonio, TX (US)

(72) Inventors: Gregory David Hansen, Fuquay Varina, NC (US); Edward Manuel Alonzo, III, San Antonio, TX (US); Manfred Amann, San Antonio, TX (US); Donnette L. Moncrief Brown, San Antonio, TX (US); Justin Dax Haslam, San Antonio, TX (US); Ashley Raine Philbrick, San Antonio, TX (US); Oscar Guerra, San Antonio, TX (US); Andre Rene Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 216 days.

(21) Appl. No.: 17/805,892

(22) Filed: Jun. 8, 2022

Related U.S. Application Data

(60) Provisional application No. 63/208,351, filed on Jun. 8, 2021.

(51) Int. Cl.
*G06F 3/00* (2006.01)
*G06F 3/16* (2006.01)
*G06F 9/4401* (2018.01)
*G06F 21/84* (2013.01)
*G06F 21/57* (2013.01)

(52) U.S. Cl.
CPC ............ *G06F 9/4411* (2013.01); *G06F 3/165* (2013.01); *G06F 21/84* (2013.01); *G06F 21/575* (2013.01); *G06F 2221/034* (2013.01)

(58) Field of Classification Search
CPC ..... G06F 21/575; G06F 2221/034; G06F 3/00
See application file for complete search history.

(56) References Cited

U.S. PATENT DOCUMENTS

| | | | |
|---|---|---|---|
| 9,101,279 B2 * | 8/2015 | Ritchey | G06F 3/147 |
| 10,169,654 B2 * | 1/2019 | Wexler | G05B 15/02 |
| 11,120,113 B2 * | 9/2021 | Sardari | A63F 13/79 |
| 2019/0156009 A1 * | 5/2019 | Maresh | G06F 21/36 |
| 2021/0191735 A1 * | 6/2021 | Clark | G06F 3/165 |
| 2021/0272375 A1 * | 9/2021 | Lashmar | G06F 3/04815 |

* cited by examiner

*Primary Examiner* — Tammara R Peyton
(74) *Attorney, Agent, or Firm* — Plumsea Law Group, LLC

(57) ABSTRACT

A method and system of providing users with microlocation-specific configuration modes during access of an application. The system identifies tokens based on sensor data during each application access session and triggers the change in configuration based on detection of specific tokens associated with a particular microlocation. The various configuration modes can be used to alter audio, display, and other settings for the application.

18 Claims, 10 Drawing Sheets

SYSTEM AND METHOD FOR MICROLOCATION-BASED WITH TOKENIZED VIRTUAL DYNAMIC SOFTWARE APPLICATIONS (APP) EXPERIENCES

CROSS-REFERENCE TO RELATED APPLICATION

This application claims the benefit of U.S. Provisional Patent Application Ser. No. 63/208,351 filed on Jun. 8, 2021 and titled "System and Method for Microlocation-Based Dynamic App Experiences", the disclosure of which is incorporated by reference in its entirety.

TECHNICAL FIELD

The embodiments relate generally to methods and systems for modifying settings of a software application for a user, and specifically to adjusting the audio, display, and/or privacy settings for the software application based on the user's determined microlocation.

BACKGROUND

User interfaces for APIs (application programming interfaces) can be used to facilitate an end user's interaction with, for example, a distributed computing environment (e.g., a web-based application), or an application residing wholly on a single computer system (e.g., a stand-alone application). Some interfaces, such as those used in the commercial or business enterprise context, have a layout of objects and widgets that is common to all versions of the interface. For example, two users will find the presentation experience of the interface to be the same. This uniform layout of objects and widgets is typical, although it does not usually serve as the most efficient layout for a particular end-user's purposes.

Although there have been various sophisticated methods developed by electronic content providers to enhance the user's online experience, users have not been provided with personalized interfaces based on patterns of the user's individual behavior and location.

There is a need in the art for a system and method that addresses the shortcomings discussed above.

SUMMARY

In one aspect, a method for adjusting a configuration of an application in response to device data is disclosed. The method includes a first step of receiving, during an application usage session, at least first sensor data from a sensor for a first computing device, and a second step of detecting a first token in the first sensor data. The usage session is associated with a first user account. In addition, the method includes a third step of determining the first token is associated with a first microlocation, as well as a fourth step of automatically adjusting, during the application access session, the configuration of the application from a first mode to a second mode.

In another aspect, for adjusting a configuration of an application in response to device data is disclosed. The method includes a first step of obtaining first image data from a first computing device associated with a first user account during a first access session, where the first image data includes a virtual representation of a first real-world object. A second step includes classifying the virtual representation as a first token for a first microlocation, and a third step includes obtaining second image data during a second access session from a second computing device associated with the first user account. In addition, the method includes a fourth step of determining the second image data includes the first token. A fifth step includes automatically adjusting the configuration of the application from a first mode to a second mode.

In another aspect, a system is disclosed for adjusting a configuration of an application in response to device data. The system comprises a processor and machine-readable media including instructions which, when executed by the processor, cause the processor to receive, during an application usage session, at least first sensor data from a sensor for a first computing device associated with a first user, and detect a first token in the first sensor data. The instructions further cause the processor to determine the first token is associated with a first microlocation, and automatically adjust, during the application access session, the configuration of the application from a first mode to a second mode.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
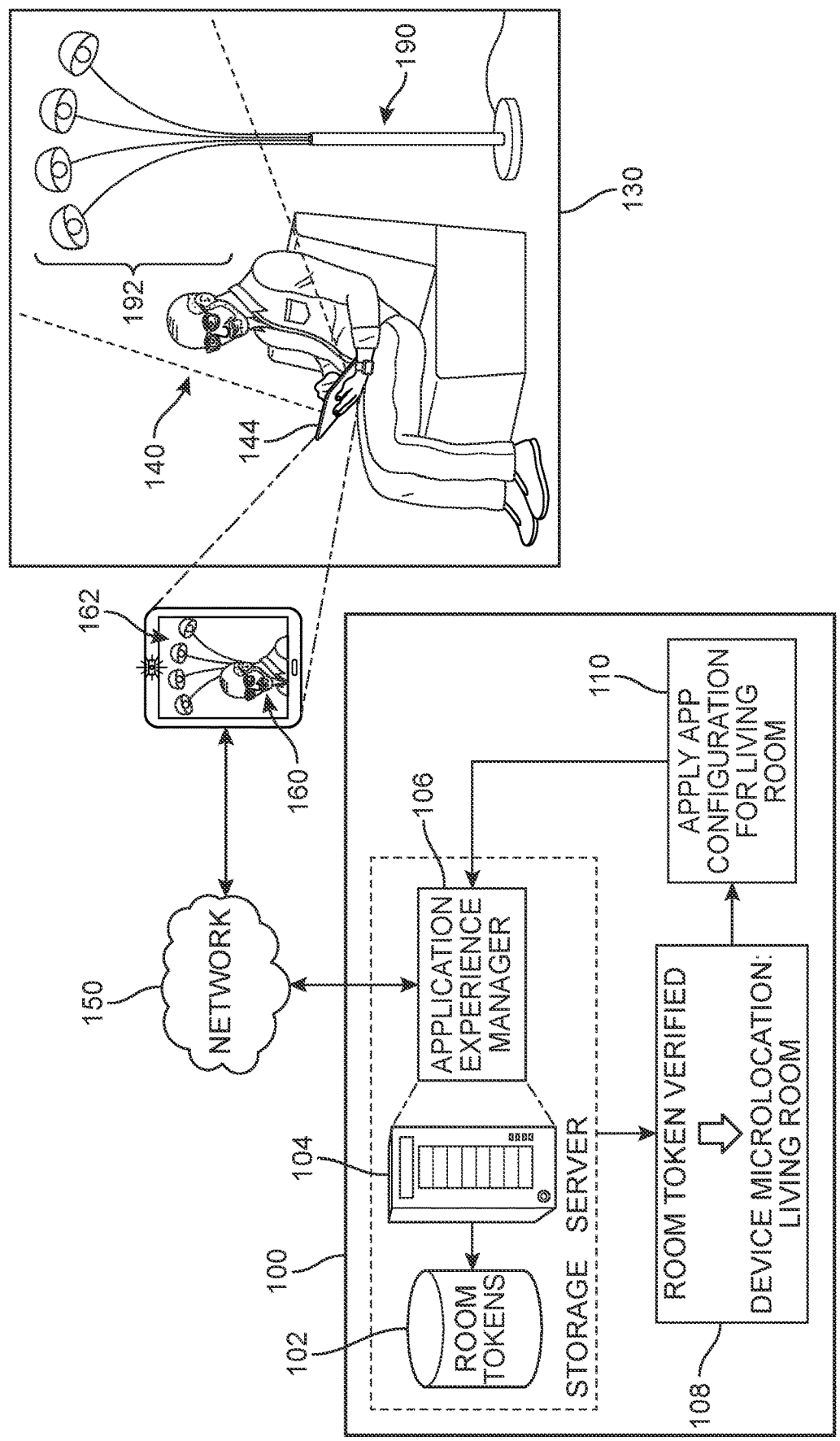
FIG. 1 is an illustration of an example of a user accessing an app from a first microlocation and the app applying a first configuration mode, according to an embodiment.

The embodiments provide a system and method for determining a microlocation for a user of a software application ("app") and providing a tailored user app configuration based on the identified microlocation. The proposed system and method can thereby provide an application interaction experience aligned with a user's preferences in each microlocation without requiring manual input from the user. In one example, the appearance of the application can be modified to be brighter, dimmer, and/or magnified to suit a user's needs based on his or her specific location. In another example, the audio settings for the app can be modified in response to the user's microlocation. In some embodiments, the app can offer multiple room "personas" for the same member, whereby the app experience is modified based on the space that the user is occupying. Thus, passive behavior by the user can cause dynamic changes in the presentation of the user interface. The system is configured to detect the user's microlocation and adjust the app experience based on the user's pre-selected preferences for that location, the user's past behavior in that location, and/or based on system-predicted preferences for that type of location. In other words, simply by engaging in their normal day-to-day in-app activities, the user's UI experience can be customized to better serve each user's needs.

As used herein, the term "user", "customer", and/or "member" should be understood to refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

In addition, a microlocation generally refers to a fixed position of the computing device as determined by sensors associated with the device. In some embodiments, detecting a microlocation can refer to the process locating an entity with a very high accuracy, possibly in centimeters. Furthermore, the term "app configuration" or "configuration mode" refer to the variable feature management and configuration services for use with web and mobile applications, microservices, and distributed environments. A change in configuration of an application can alter the available resources, settings, operation, and behavior of the app. Depending on the app and its purpose, the available configuration modes may vary.

Referring now to FIG. 1, for purposes of introduction, a first user 140 is shown with a first computing device ("first device") 144 seated on a sofa in a first physical space 130. The first user 140 is accessing a first app 160 via the first device 144. The first device 144 can include an electronics unit comprising a plurality of different components, such as a user interface component (e.g., a touchscreen display, keyboard, mouse, microphone, Braille terminal, etc.), a sensor unit (including one or more cameras or other image-based sensors), a user interface module, a processor, and/or a communication module. In some embodiments, the first device 144 may also include a microphone and speaker. In this example, first device 144 is a computer tablet.

Furthermore, the first device 144 may include a system including one or more processors and memory. Memory may comprise a non-transitory computer readable medium. Instructions stored within memory may be executed by the one or more processors. The first device 144 may be configured to receive and analyze data from various sensors associated with the sensor unit in the first device 144 or data that is communicated from external components or devices to first device 144. In different examples, the sensor unit includes a variety of sensors. The sensors can include one or more of an image sensor such as a camera, a light sensor, a temperature sensor, an infrared sensor, a microphone, a speaker, an air or chemical sensor, among others. In some cases, the first device 144 may also include a navigation system equipped with a GPS receiver that can receive GPS information or other receivers capable of receiving global or local positioning information.

A communication module may allow the first device 144 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1, the first user 140 is able use first device 144 to capture and transmit views of real-world objects in the environment of first physical space 130 around him or her, as well as ambient sounds. The first physical space 130 can refer to any physical environment such as a room in an office, residence, or other building, as well as open or outdoor spaces. In this case, the first physical space 130 is a room of a residence, such as a living room. In this encounter, as the first user 140 accesses the first app 160, first app 160 can initiate a microlocation identification process. For example, first app 160 can receive image data 162 and/or audio or other types of data associated with the first physical space 130.

Figure 3:
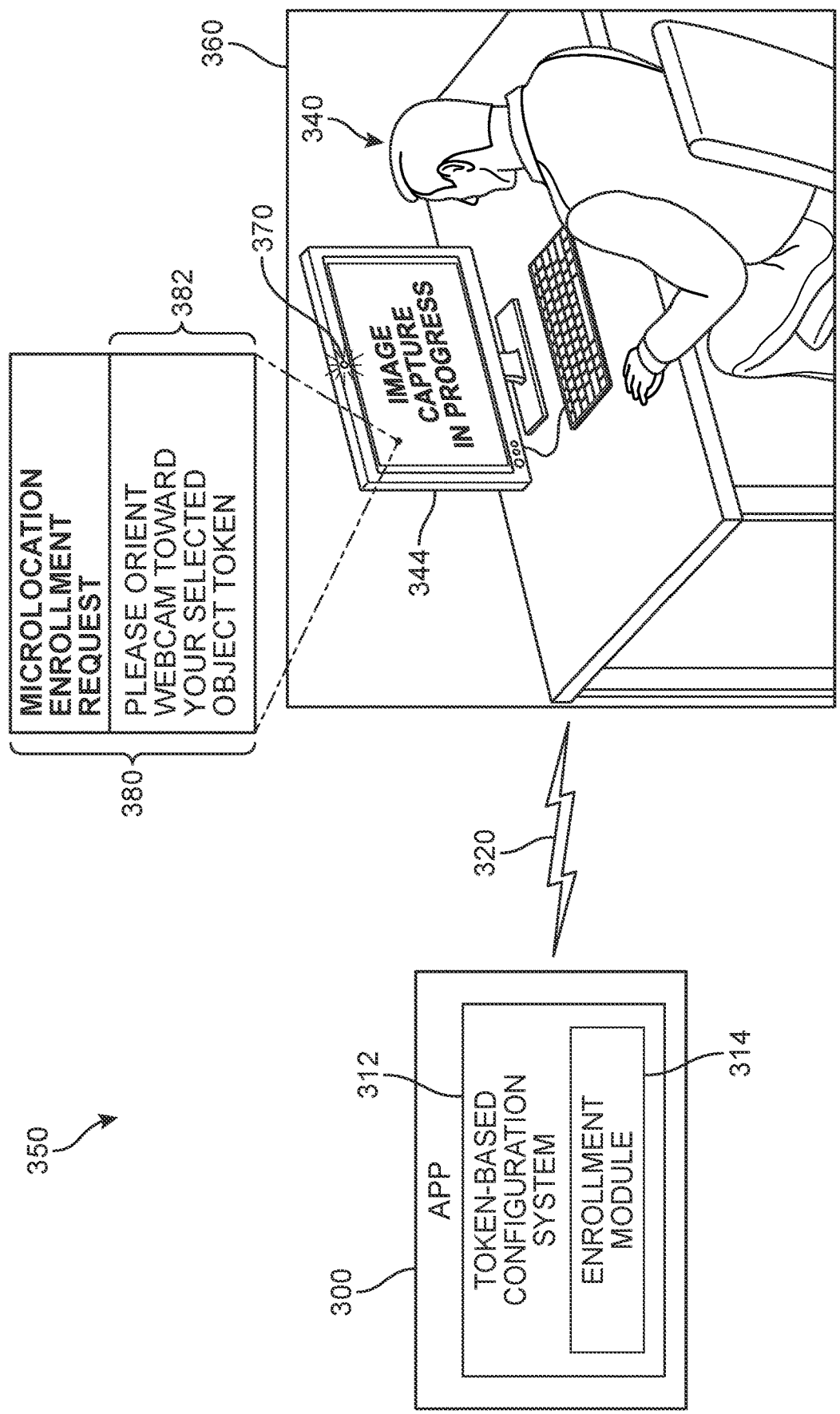
FIGS. 3-5 illustrate a sequence in which a first user enrolls one or more tokens for identifying his microlocation, according to an embodiment.
Figure 4:
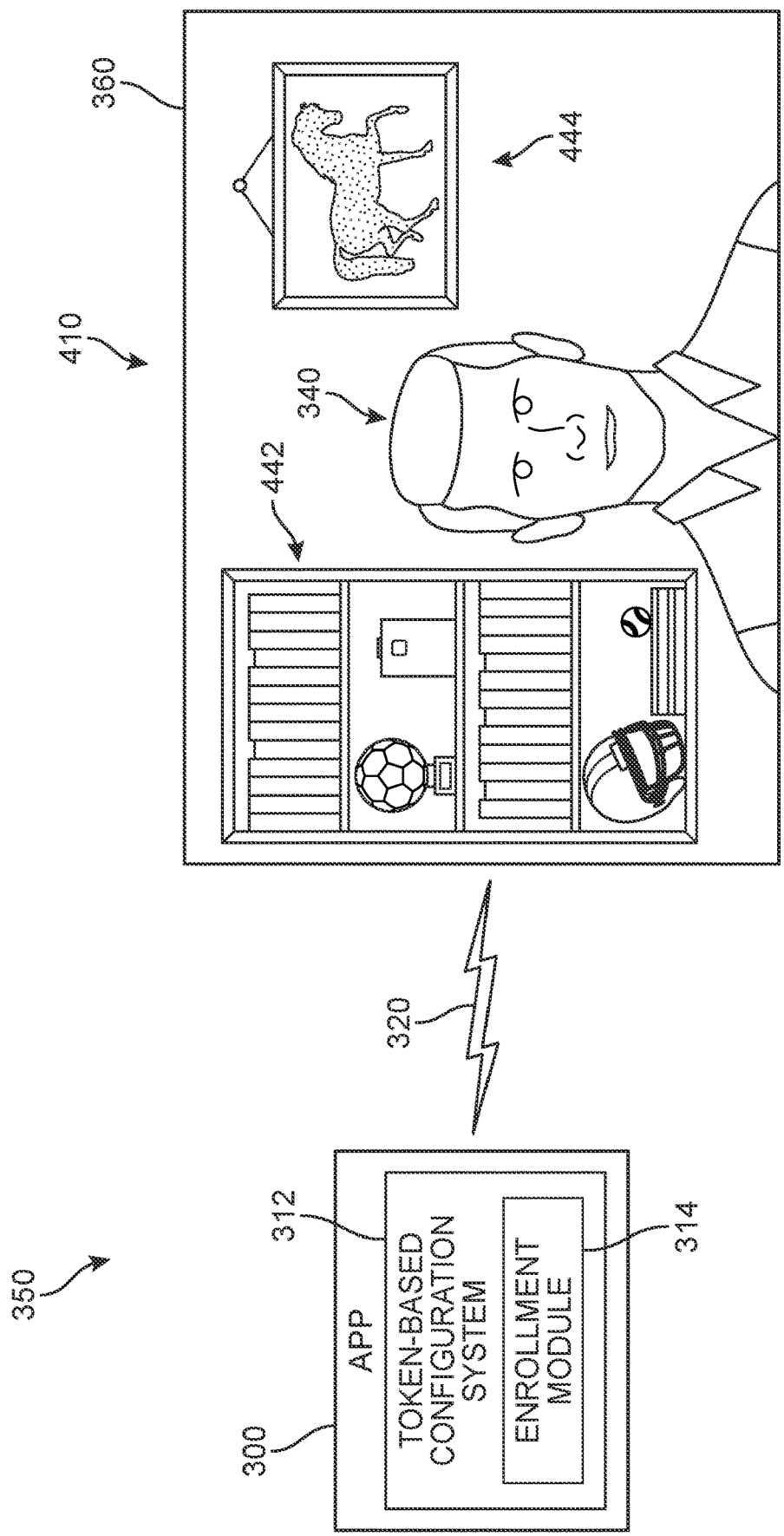
Figure 5:
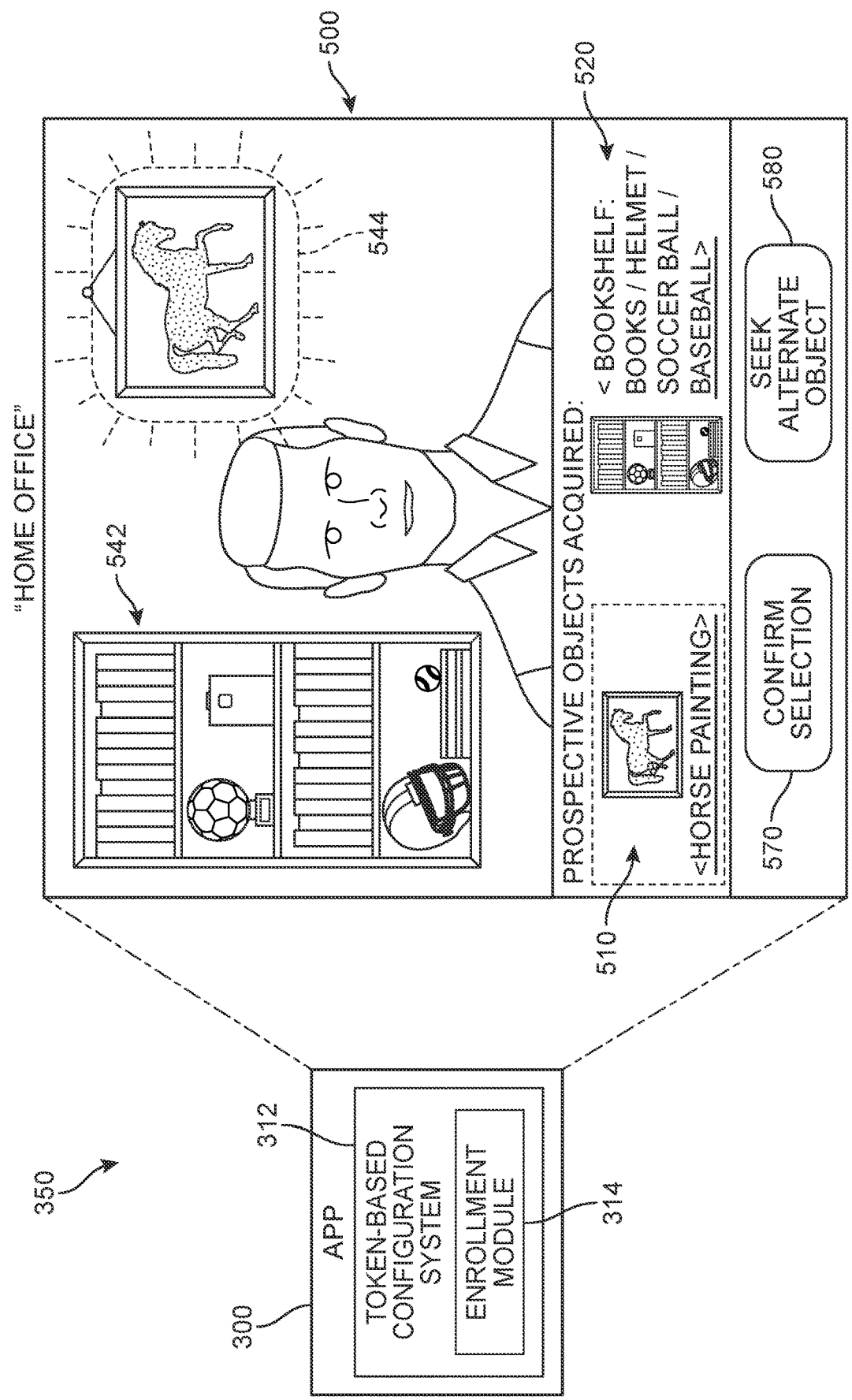

In this example, it is to be understood that at a time prior to the current app access session, the first user 140 provided information about his or her environment and one or more specific objects disposed in that environment (e.g., via an enrollment process as depicted in FIGS. 3-5). The object(s) were scanned, stored, and linked to the microlocation for the first user as a "room token". For purposes of this application, a room token refers to a tangible or intangible object that is associated with a specific space and whose presence when detected serves to indicate the user's current microlocation. The room token selected for a particular room can thus vary widely and essentially can refer to any item that may be detected by a sensor linked to the user's computing device. In this example, a first room token ("first token") 192 is a tangible object comprising an upper portion of a floor lamp 190 that is situated directly behind the first user 140. It should be understood that a room token may not be unique (e.g., various objects of the same type or similar sounds can be found in multiple user rooms), but due to the token being selected and linked to the specific room and later found to be detected in the proximity of the user, such tokens can nevertheless serve as secure, reliable microlocation identifiers. As will be discussed below, in other embodiments, alternative methods of determining the user's microlocation may also be used.

In the example of FIG. 1, the image data 162 is transmitted via a network 150 to an app experience system 100. A remote server 104 can process the image data. A set of features may be extracted that will be matched with feature sets that had been previously captured and stored in a secure storage 102 linked to the user's account ("room tokens"). If a match module 108 can verify that the current image and the image of the stored room token are a match (e.g., with a particular level of confidence), the user's microlocation can be determined. In this example, an image of the first token 192 is received by the system as image data 162 and compared to the record of the room token previously assigned to or selected by first user 140 for that room. A match between the two sources is confirmed, and the system assigns the microlocation associated with that token to the user for the current session. In one embodiment, the user may be asked if he or she would like to switch the configuration mode of the app based on their new microlocation. In other embodiments, the system can also automatically apply a different configuration mode 110 based on the microlocation of the first user 140. Thus, in FIG. 1, without further action by first user 140, an app experience manager 106 can alter the app appearance or adjust other settings to align with the settings desired for app usage in the living room.

Figure 2:
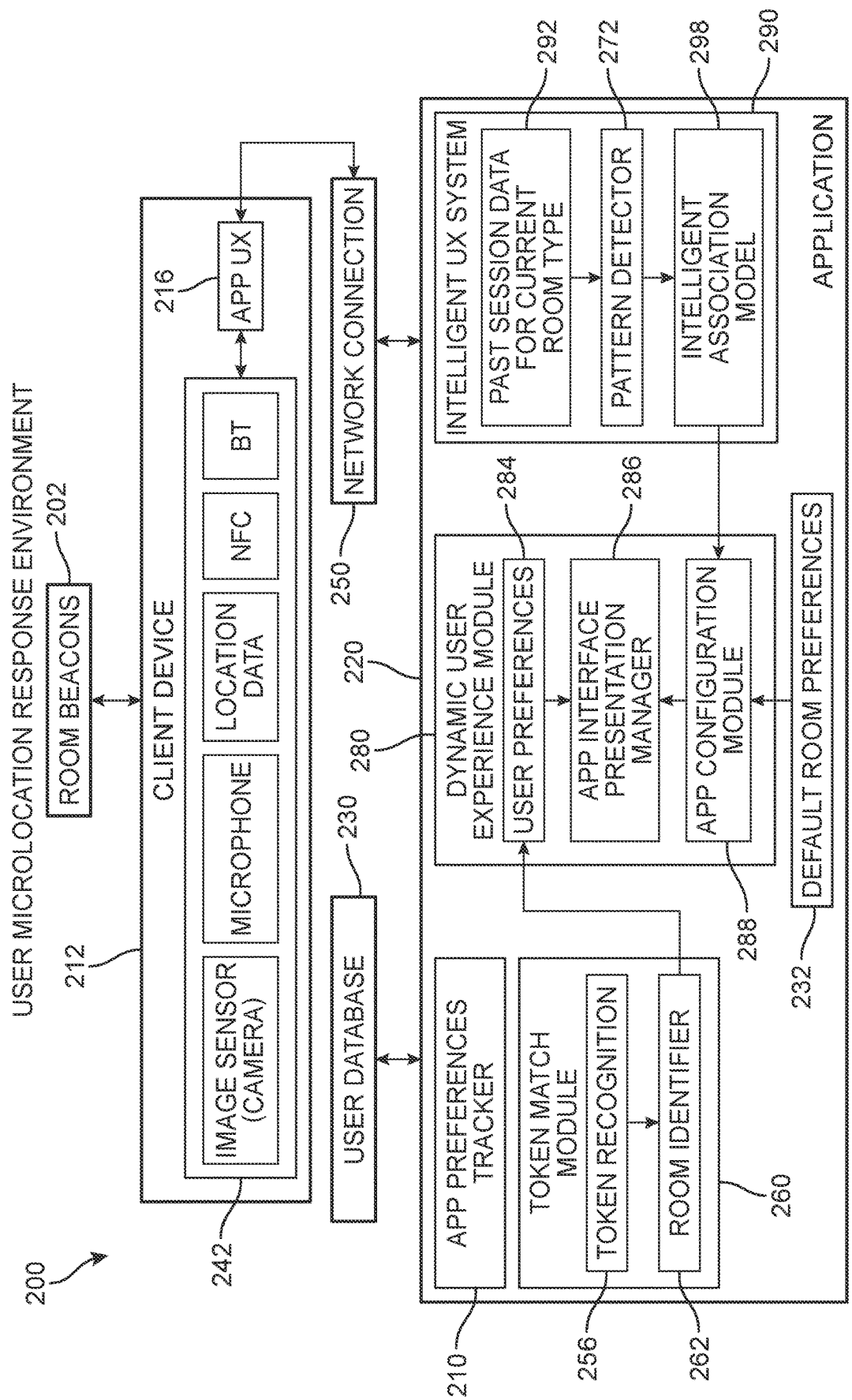
FIG. 2 is a schematic diagram of a system for automatically and dynamically altering the application configuration state based on a user's microlocation, according to an embodiment.

In order to provide the reader with a greater appreciation of the embodiments, FIG. 2 depicts an overview of an embodiment of a user microlocation response environment ("environment") 200 in which a user's microlocation is monitored and used to determine which app configuration should be presented to an end-user while they (i.e., their device) are situated in that microlocation. In addition, in some embodiments, the environment 200 and/or application ("app") 220 includes an intelligent user experience system ("intelligent system") 290 configured to provide customized instructions to app 220 in order to learn, improve, and cause to present the most relevant configuration mode to the user at each microlocation.

As shown in FIG. 2, the environment 200 includes a client computing device ("client device") 212 configured to communicate with app 220 over a network connection 250. While the various components of environment 200 are shown as being accessed through a cloud network and/or stored on a cloud-based server in FIG. 2, in other embodiments some or all components described herein can be reside in client device 212 and/or a remote server.

In different embodiments, the client device 212 includes a visual output (display) and audio output (speaker) components that can present information and media for the application 220. As noted above, in some embodiments, app 220 can represent a product/service support software that is associated with a provider of the product/service of interest to a customer or other user. However, in other embodiments, the app can refer to any instance of software running on client device 212. In some cases, the user can receive and send information through a user interface ("App UX") 216 that may be presented on the device. The user interface may refer to an operating system user interface or the interface of one or more software applications that may run on the client device 212, such as app 220.

In different embodiments, the user may, desiring the services or features provided by app 220, access app 220 via client device 212. As one non-limiting example, the app 220 can represent an interactive platform that provides a site from which the customer can create and maintain an account, access information and options related to the entity and its products or services, perform various tasks, review and/or modify their account details, and/or communicate with personnel of the app-providing entity. In other embodiments, the app can represent any software application being accessed by the user. As shown in FIG. 2, the user can enter various inputs via client device 212 that are received by an input processor of the app 220. In some embodiments, the app 220 will generate a log of these inputs and selections for a given microlocation using an app preferences and activity tracker ("tracker") 210. For example, the tracker can be configured to automatically transfer the data in real or near real-time to the user specific token-location database ("database") 230 for storage. As will be discussed below, in some embodiments, intelligent system 290 may extract such past session data 292 from database 230 to identify patterns in user in-app behavior.

In different embodiments, the database 230 includes a content library that stores account data related to one or more users. The data may include image data in which objects—represented virtually or digitally—may be recognized and/or tagged in videos, still images, or both (referred to collectively as image content). In one embodiment, each image content has associated metadata, such as keywords, tags, or a textual description of the image content. In some embodiments, the stored object token(s) may store pre-stored image patterns and executable files associated with one or more computer vision applications (e.g., OpenCV). A computing device may execute a computer vision application that may identify the objects captured in the image content. Similarly, audio data may be stored that corresponds to ambient sounds for a particular location, or even user utterances at a microlocation. For example, if a user walks into a room and states "Kitchen" or "I'm in the kitchen" the app 220 can be configured to attach the audio label to the given microlocation and/or identify the current room as the kitchen (if user is at home) or a kitchen (if user is away from home).

In the embodiment of FIG. 2, the app 220 is also configured to receive sensor data about the client device's current environment, such as but not limited to location specific data ("sensor data") 242. The sensor data 242 can encompass one or more of image data, audio data, GPS (location) data, temperature data, and other data that may be collected via sensor components associated with client device 212. In addition, any (intentional) user preferences regarding the configuration mode of App UX 216 at a particular microlocation will also be received by input processor for storage in database 230. In some embodiments, the manually entered user preferences will override any automated recommendations for modifying the configuration mode of the app. For example, in some embodiments, user feedback and/or user selections about the appearance of the app during or after a session in a particular microlocation can determine the appearance of the interface for some or all of the subsequent access sessions in that microlocation.

In different embodiments, when initiating an app session or during the app session, a dynamic user experience module ("dynamic module") 280 can be configured to automatically present or apply a configuration mode that has a high probability or likelihood of best corresponding to the user's preferences for that location. For example, when the app 220 receives a login request, the app 220 may obtain sensor data 242 via one or more sensors associated with the client device 212. The sensor data 242 is processed to extract specific features by token match module 260. Furthermore, a token recognition component 256 is configured to identify if there are any tokens in the data, with reference to previously stored tokens in user database 230.

In one embodiment, the processing algorithms perform compression, artifact correction, noise reduction, color corrections, geometric corrections, imager non-uniformity correction, etc., and various processing enhancement operations on the image and/or audio content captured by sensors of the client device 212. The image processing algorithms are numerical and symbolic algorithms for the manipulation of, for example, images and video streams captured by the device camera. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. Image processing may also include machine learning techniques that can be used to discriminate between features and to identify objects, for example via image recognition and object detection software.

Such techniques may also include, but are not limited to, machine vision algorithms that perform, among other operations, digit recognition, printed and handwritten text recognition, symbol, logo and watermark recognition, and general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

Thus, token recognition component 256 is configured to detect one or more visual, audio, or other data objects in the sensor data 242. The token match module 260 can then determine whether the detected token(s) are a match with previously registered tokens by the user (see FIGS. 3-5) stored in database 230. For example, the app 220 can execute an object recognition protocol to identify one or more image features of the image content and then determine an identification of the object(s) in the image content based upon the one or more features of the digital image identified by the executed object recognition protocol. In some embodiments, the app 220 can generate an object profile of the detected objects based upon one or more data records of the object stored in the object token database for that user account, where each respective record contains data corresponding to a valuation of the respective object. In other words, object tokens can be processed to generate a value corresponding to the image data for that object. In one embodiment, the object profile also stores member identifier data associated with the user who submitted the image content. If subsequent image data includes a substantially similar valuation, it can be determined that a match has occurred. Similar steps can be taken with audio data that can include audio tokens. In other words, the received room token value is compared by the token match module 260 with the stored object token value ("verification value"), and if a match is found or is in an acceptable range, the system identifies the user's microlocation via room identifier 262.

In other embodiments, a user may not have stored any room tokens, and instead, generic tokens are identified and used to determine the user's microlocation. As one non-limiting example, if the sensor data 242 includes images of a bed, and the token recognition component 256 recognizes a bed in the sensor data 242, the room identifier 262 can identify the microlocation as a bedroom. In such cases, a configuration mode including parameters corresponding to default room preferences 232 provided by the app for a bedroom can be applied. However, it should be understood that a user's enrollment of a token overrides the generic room identifiers. In other words, if a user has enrolled the image data for a bed and indicated the room is an office, that microlocation will be assigned an office designation. In other embodiments, it may be appreciated that no preferences for a given microlocation are available. For example, the user may be using the app in a particular location for the first time. In some embodiments, default room preferences 232 may also be applied.

In still other embodiments, a user may install one or more room beacons 202 or be using client device 212 in a microlocation equipped with one or more room beacons 202. Such beacons can be tangible (actual devices mounted or positioned in the room) or they may be virtually generated via Wi-Fi. In some embodiments, the App UX 216 can receive sensor data 242 from near-field communications (NFC) and/or Bluetooth (BT) components of client device 212 and room devices. When the client device 212 receives the signal from a unique reference point (beacon device), then the client device is understood to be in coverage range of the reference point, i.e., in close proximity to the reference point. The room associated with that reference point will then be recognized as the user's microlocation.

The microlocation can be used to select the approved user preferences 284 for that microlocation from database 230. These user preferences 284 are provided to dynamic module 280. An app interface presentation manager 286 can receive the user preferences 284 and determine the configuration mode that corresponds to the selected preferences with reference to an app configuration module 288. The app interface presentation manager 286 then generates the appropriate configuration for presentation to the user via the App UX 216.

In some embodiments, a user may not have manually specified any preferred configuration for a particular microlocation. As shown in FIG. 2, app configuration module 288 may also be in communication with intelligent system 290. In different embodiments, intelligent system 290 is configured to receive sensor data 242 and data from user database 230 as input for an intelligent association machine learning model ("model") 298. In some embodiments, the sensor data 242 can be segregated or otherwise classified for use by the model 298 to include specific types of information (contextual cues), such as past session data for that location 292 and previous pairings or links the user has requested at that location. In this case, "pairings" or "links" refers to associations or relationships identified or generated by model 298 between a specific user preference and the microlocation. These pairings can be determined in large part based on recurring patterns of use detected over time and multiple sessions by a pattern detector 272.

If there is sufficient data to make such a determination, the model 298 can be configured to provide output corresponding to the most likely configuration mode to app configuration module 288. The app configuration module 288 uses this information to select the appropriate app layout and settings that matches, aligns with, and/or is best configured to allow the user to experience the app in a manner similar to previous occasions when the user was in the same microlocation.

In addition, in some embodiments, the model 298 can be configured to learn over time. For example, the model 298 can receive user feedback directly from the user (i.e., as manual input) and/or automatically when new or changing usage patterns are detected. In one embodiment, if the provided configuration mode successfully provided the settings the user had desired, as reflected by data collected by app preferences activity tracker 210, the model's association is reinforced. However, if the user changes the settings provided, the model can remove the association/link or assign the association a lower probability or likelihood of representing the configuration mode with the desired options/features. In addition, or alternatively, the app 220 may request that the user submit feedback regarding their experience, including whether the proffered configuration mode was aligned with their intended expectations during the current access session, or via communications to the user at a later time asking about their experience. Based on the feedback, the model can reassess the value of that recommendation for future instances of the same or similar contextual data.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors.

In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Referring now to FIGS. 3-5, an example of an enrollment or training and record acquisition session ("enrollment session") 350 for collection of data and selection of room token(s) that may be used by some of the proposed systems is depicted. The enrollment session 350 can, in some embodiments, be used to collect data and identify features that are present in the physical context of an individual and will then be stored in a database (see FIG. 2). In this case, a second user 340 is located in a second physical space 360 which is a home office of a residence. It should be understood that second physical space 360 can comprise any other type of space where the user resides or works or otherwise frequents, including other rooms of his or her home, meeting rooms at his or her workplace, or even a library, vehicle, outdoor space, or other place of business.

In FIG. 3, the second user 340 is, via a third computing device ("second device") 344, interacting with a token-based app configuration system 312 for an app 300 over a network 320. The second user 340 has requested and/or been offered the opportunity to register a token for a particular microlocation in his account. In this case, an enrollment module 314 presents a first user interface ("first interface") 380 that displays a first message 382 ("Please orient webcam toward your selected object token". In other embodiments, the communication can occur in part or fully via a video conferencing interface whereby the second user 340 moves through the room in order to allow the app 300 to collect visual data for the microlocation. In another example, the token may be audio-based, and sounds will be collected during enrollment. In the example of FIG. 3, once the second user 340 provides his consent to the enrollment, an image capturing event is automatically triggered by the system, and image data collected by an image sensor ("camera") 370.

In different embodiments, the image data that will be collected during subsequent app usage sessions can be processed in a similar manner to extract the same set(s) of features which can then be matched with the feature sets stored in the database during the enrollment session 350. In FIGS. 4 and 5, one example of a possible process by which the feature sets collected during enrollment and training session(s) and subsequent app access sessions can be processed and classified is presented simply for purposes of illustration. In FIG. 4, a first view 410 of the second physical space 360 as viewed by the camera 370 of FIG. 3 is depicted. The first view 410 includes images of the second user 340, as well as assorted objects disposed in the room behind second user 340, such as a bookcase 442 and a painting 444. The first view 410 is captured by the camera and transmitted over network 320 to enrollment module 314 for processing. The captured data is presented as a first image 500 in FIG. 5. It should be understood that while static images are illustrated in the drawings for purposes of simplicity, in other embodiments, the image processing can draw on data collected from real-time video of the user and his or her environment. In other words, the image data used to classify any object tokens can be static or dynamic.

As shown in FIG. 5, first image 500 includes an automatic detection and tagging of one or more potential object tokens visible around or in proximity to the second user. Multiple tokens may be detected; in this case, the system detects a painting token 544 and a bookshelf token 542, as well as sub-tokens disposed in bookshelf, such as a helmet, soccer ball, baseball, and books. Sub-tokens can be used to more accurately identify the larger token. For example, the same type of bookshelf may be present in multiple rooms or microlocations. The sub-tokens can verify that the bookshelf is the bookshelf token 542 for the home office. In some embodiments, once the objects have been detected, they can be presented to the user as a first prospective token 510 and a second prospective token 520.

In this case, the system automatically pre-selects the painting as a second token and highlights or otherwise visually indicates such a selection for review by second user 340. In other words, the system automatically determines that the painting token 544 represents the optimal or 'best-fit' object for purposes of microlocation determinations. In other embodiments, multiple potential room tokens may be identified and presented as prospective candidates. In still other embodiments, the system may identify a first choice but present alternate choices upon the request of a user. In one embodiment, the user may tap the portion of the screen corresponding to a different object to request that a specific object be recognized as the object token. In some embodiments, the system can ask the user to move around the room or other physical space until the user is near an object that appears to have a relatively stable pose and is clearly and readily visible to the camera, and ask that the user if the visible object can be used as the token object. If so, the camera may capture the image and the object selected for use as the token object.

In this example, the system offers selectable options for proceeding, such as a first option 570 ("Confirm Selection") and a second option ("Seek Alternate Object") 580. The label "Horse Painting" in this case can be automatically applied following recognition of the object and type of object by the intelligent system (for review by the user or agent), or typed or otherwise directly inputted by the user. These options are shown for illustrative purposes only, and any other options may also be offered. Once the second user 340 confirms the selection, the enrollment process is complete, and the painting object 544 securely stored by the system and linked to the second user's account for reference by the system during subsequent app access sessions by the second user.

While only one enrollment sequence is shown here, it can be appreciated that in different embodiments, the second user 340 may opt to register multiple object tokens with his account. For example, he may have one token saved for a first microlocation (e.g., his bed in the bedroom), and a second and third token saved for a second microlocation (e.g., the sound of a lullaby and the image of a teddy bear in the nursery), a fourth token for a third microlocation (e.g., sound of a car engine running when he is in his vehicle), etc. The user can permit the app to obtain sensor data in order to identify the location in which he is accessing the app, and the system can determine whether there is a token present that corresponds to previously stored tokens and the associated microlocation. In addition, in different embodiments, the user may opt to provide enrollment data updates at different intervals. For example, the user may move residences or change jobs, or experience some other change that may affect the validity of the token previously stored, and therefore he may request to submit new data.

Figure 6:
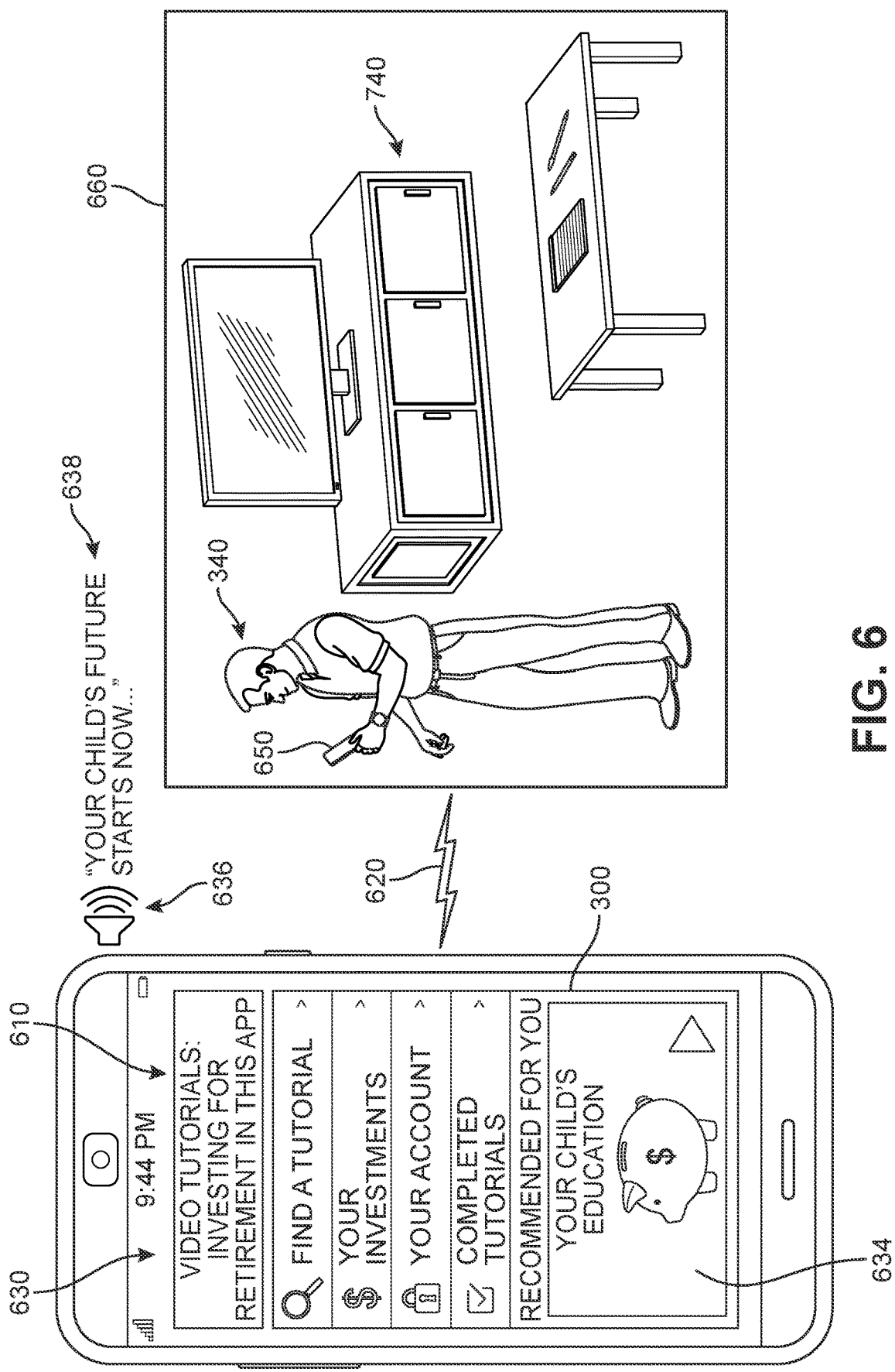
FIG. 6 is an illustration of the first user accessing the application from a living room and experiencing a first configuration mode, according to an embodiment.
Figure 7:
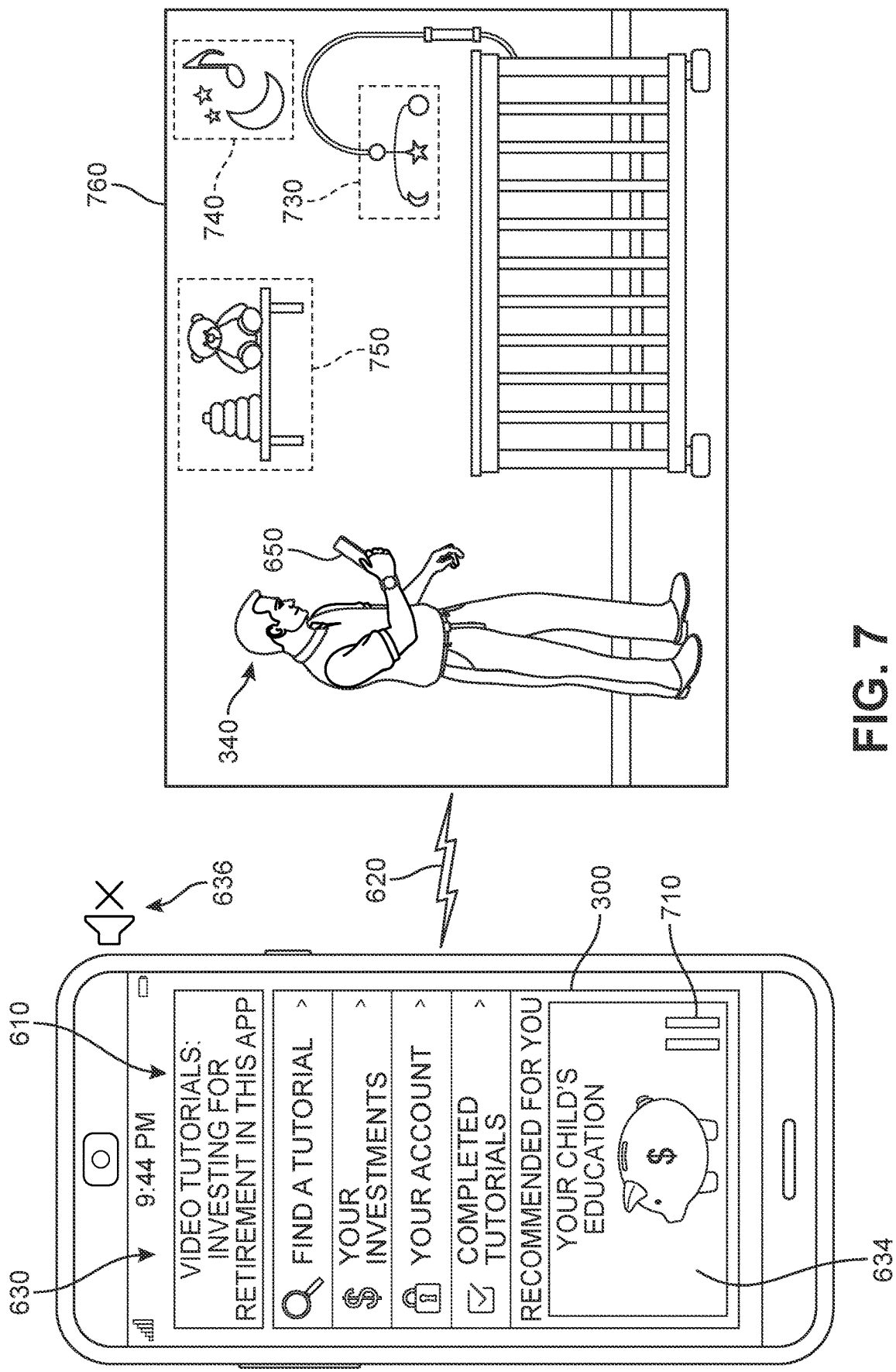
FIG. 7 is an illustration of the first user accessing the application from a nursery and experiencing a second configuration mode, according to an embodiment.
Figure 8:
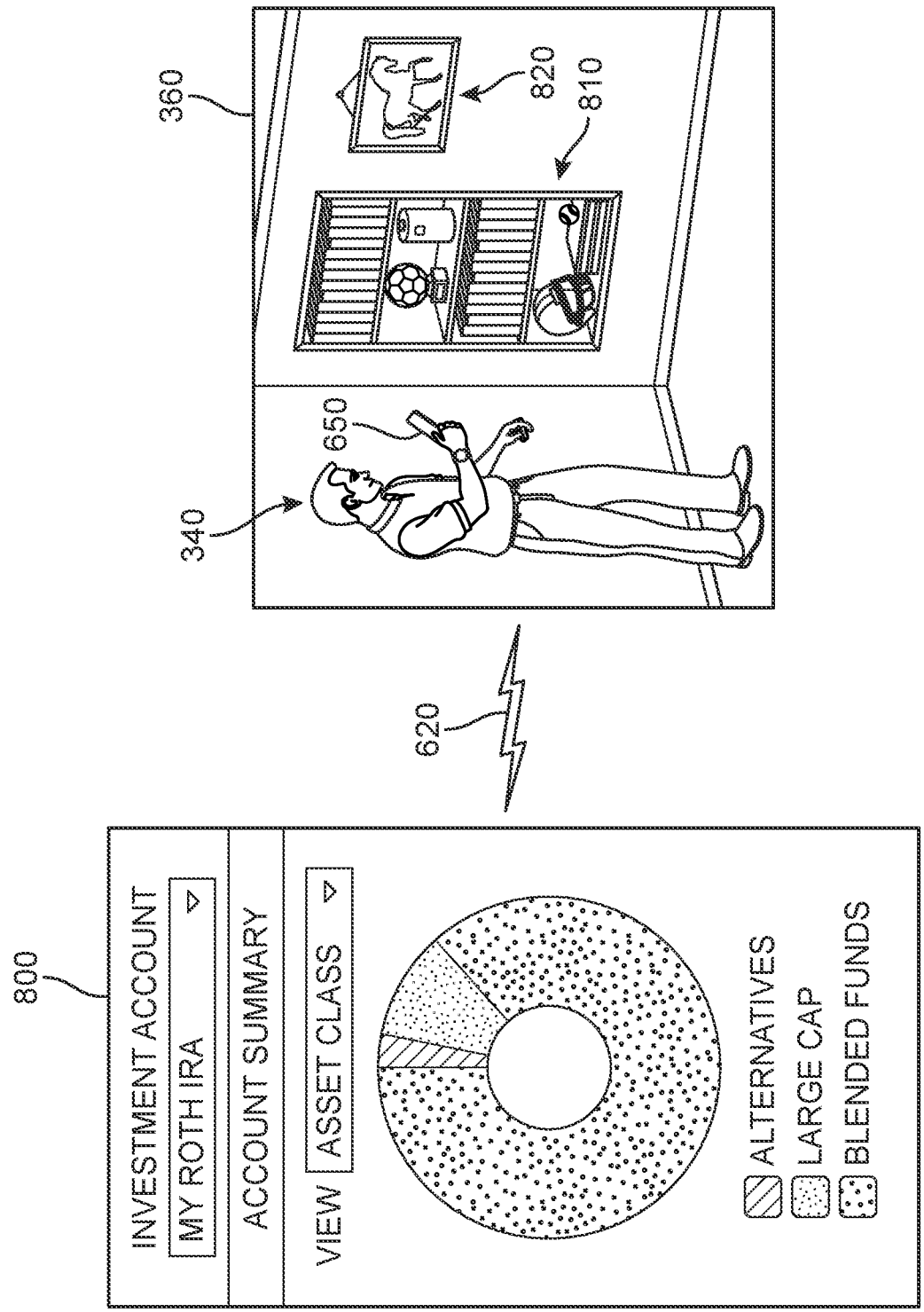
FIG. 8 is an illustration of the first user accessing the application from a home office and experiencing a third configuration mode, according to an embodiment.

For purposes of illustration, an example of a scenario in which an embodiment of the proposed systems may be implemented is shown with reference to FIGS. 6-8. It can be understood that for purposes of this example, the second user 340 is the same user of FIGS. 3-5 for whom enrollment in the token-based app configuration system has already occurred. The second user 340 is shown accessing app 300 via a third computing device ("third device") 650, which in this case is a mobile phone. The access session is occurring at a time subsequent to the enrollment stage described earlier. In other words, second user 340 has previously participated in a data collection session with the goal of providing the app with tokens for identifying microlocations, and those token(s) are stored in a database accessible by the system.

During this session, the second user 340 is in his living room 660 and begins viewing an app feature that provides education and information about his financial resources. For example, a first interface 610 presented on a display 630 of third device 650 offers a series of tutorials with video. The second user 340 begins playback of a video content 634 ("Your child's education") shown on the display 630. The tutorial also includes audio content 638 ("Your child's future starts now . . . "). The volume level of a speaker 636 for third device 650 is at a maximum or loud level. At this time, the configuration of app 300 can be understood to be in a first mode.

As the third device 650 is a mobile computing device, the second user 340 is able to move through his home. Thus, the second user 340 may walk through the various space (microlocations) of his residence during his use of app 300. In FIG. 7, second user 340 has entered a nursery 760. As he walks into this room, the sensors for third device 650 can monitor the space for images and sounds that may include tokens for a new room. As the third device 650 pans into the room, one or more enrolled tokens may be detected, such as a first token 750 (image of bear and toy), a second token 730 (a crib mobile), and a third token 740 (audio of a lullaby). In response to detection of one or all of these tokens, the system can automatically switch the configuration mode to one in which video and audio content are blocked or otherwise disabled. Thus, in this case, the system causes the app to pause playback 710 of the video content 634 and/or mute the audio of speaker 636. In other examples, the display itself may be dimmed or even turned off, the audio may be reduced rather than muted with the video continuing playback, or the video may continue with closed captioning. In other words, second user 340 is able to move into a microlocation where a light or noise disturbance is unwelcome and have the app automatically adjust its settings to accommodate the new preferences associated with the nursery 760. At this time, the configuration of app 300 can be understood to have switched to a second, different mode.

For purposes of this example, second user 340 may be understood to now attempt to access his personal account information. This information may be understood to include sensitive data that second user 340 has indicated should remain private. Because the app 300 determined the second user 340 was in a microlocation that is often shared with other people, it does not allow him to view the account details. In response, second user 340 continues to move through his home, leaving the nursery and walks into another microlocation, in this case his home office 360, as illustrated in FIG. 8. As he walks into this room, the sensors for third device 650 continue to monitor the space for images and sounds that may include tokens for a new room. As the third device 650 pans into the room, one or more enrolled tokens may be detected, such as a fourth token 810 (image of bookshelf and subtokens) and a fifth token 820 (image of the painting). In response to detection of one or both of these tokens, and their matching the tokens stored in the database, the system can automatically switch the configuration mode to one in which display of the sensitive data is permitted, as represented by a second interface 800. At this time, the app can be understood to have switched to a third mode that differs from both first mode and second mode.

It should be understood that, in some embodiments, a user may label or otherwise tag a particular room (represented by one or more room tokens) in order to trigger one or more specific changes to the app configuration upon entering that room. In some cases, a user may expressly store preferences for the app that are room or object-token specific. In one example, with reference to the nursery 760, a user may have indicated that detection of items or other data that indicates the user has entered the nursery should automatically cause a change in the app configuration to a "quiet mode". Similarly, in some embodiments, the app can provide options to quickly assign one or more rooms with preset configuration modes, such as a "quiet mode" or "quiet zone" for a first room/space, "bright mode" for a second room/space, "sharing mode" for a third room/space, which will be applied automatically when the user enters those spaces with the device. In some cases, the user can create configuration mode shortcuts with personalized settings that may be given labels such as "Silent", "Dim", etc., and be quickly assigned to or removed from one or more rooms. In some embodiments, the larger environment (e.g., house, business, building) can impose these room-specific configuration modes directly through the local network in order to ensure devices are being used appropriately based on the device location. Thus, if a guest of the user were to enter the nursery 760, their device could also be automatically switched to a quiet mode based on their guest access to the home's network.

Figure 9B:
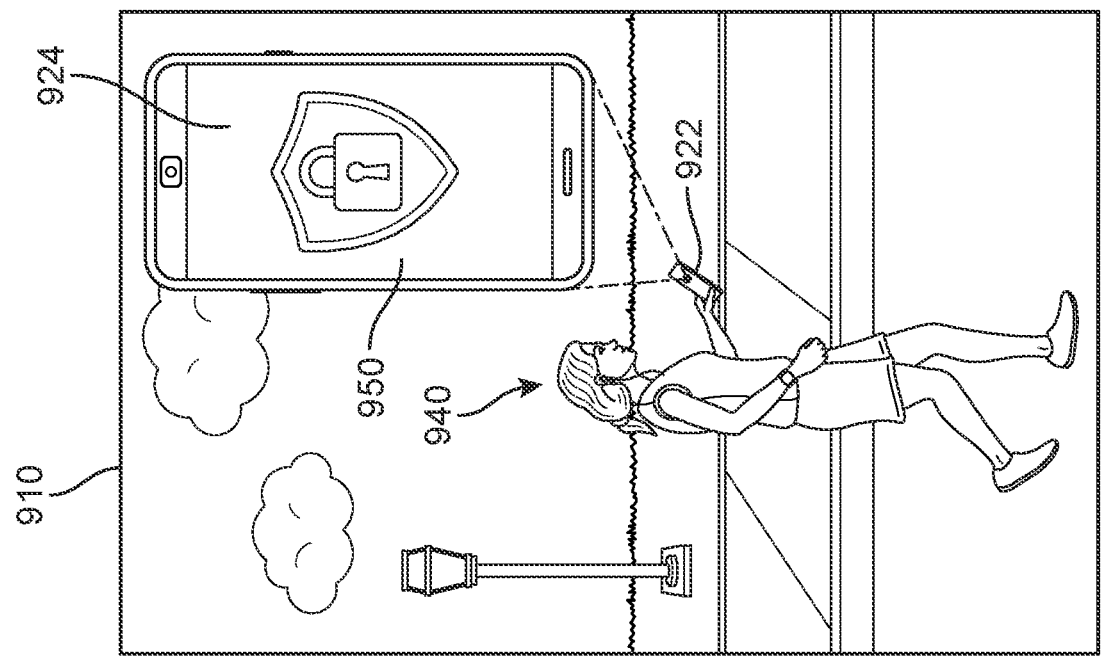
FIGS. 9A and 9B illustrate an example in which a second user experiences different application privacy configurations based on microlocation, according to an embodiment.
Figure 9A:
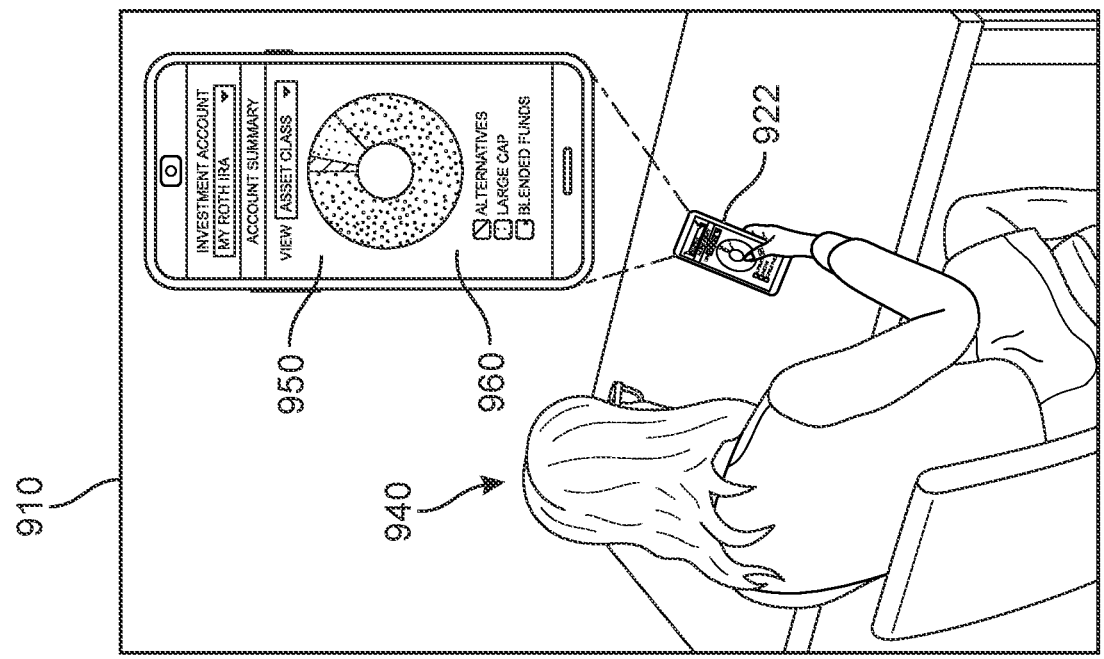

For purposes of clarity, an alternative example of the proposed embodiments is presented with reference to FIGS. 9A and 9B. In FIG. 9A, a third user 940 is shown seated at a desk in a first microlocation 910. Third user 940 is viewing confidential information 914 through an app 950, accessed via a fourth computing device ("fourth device") 922, also a mobile phone. However, once the third user 940 leaves the first microlocation 910 and exits the space where she has identified as safe for viewing of such information, the app 950 can automatically modify the app configuration to prevent viewing of the same information. For example, as she exits the building in which first microlocation 910 was disposed, the sensors for fourth device 922 can monitor the environment for images and sounds. When no tokens are detected that are associated with a safe viewing location, the app 950 automatically switches to a configuration mode that activates privacy settings 924 for app 950.

Figure 10:
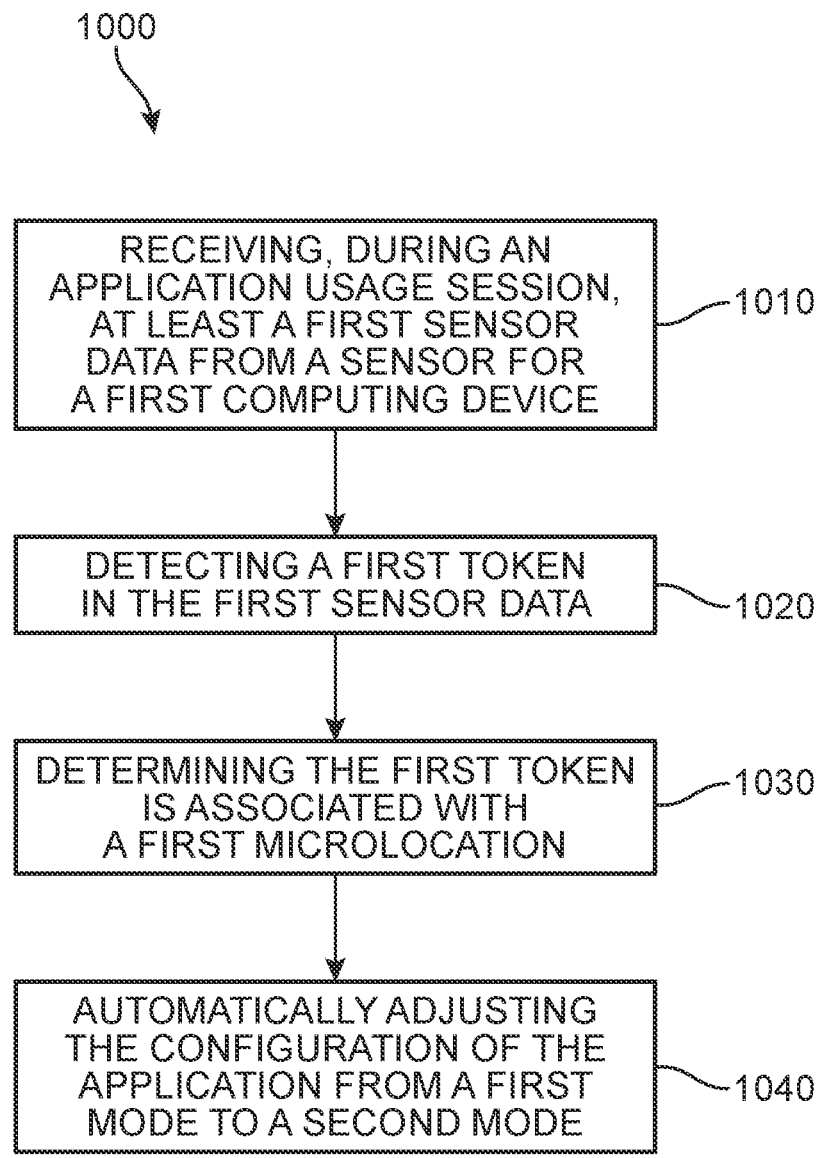
FIG. 10 is a flow diagram of a process for adjusting an application configuration state based on a user's microlocation, according to an embodiment.

FIG. 10 is a flow chart illustrating an embodiment of a method 1000 for adjusting a configuration of an application in response to device sensor data. The method 1000 includes a first step 1010 of receiving, during an application usage session, at least first sensor data from a sensor for a first computing device, and a second step 1020 of detecting a first token in the first sensor data. The usage session is associated with a first user account. In addition, the method 1000 includes a third step 1030 of determining the first token is associated with a first microlocation, as well as a fourth step 1040 of automatically adjusting, during the application access session, the configuration of the application from a first mode to a second mode.

In other embodiments, the method may include additional steps or aspects. In one embodiment, the first sensor data is one of image data and audio data. In another embodiment, the first mode enables audio output from the application and the second mode disables audio output from the application. In one example, the second mode enables closed captioning for the application. In another example, the first mode enables video playback from the application and the second mode disables video playback from the application. In some other embodiments, the method can also include a step of obtaining the first sensor data via a camera associated with the first computing device. In such cases, the first sensor data includes a virtual representation of a first real-world object that is located in proximity to the first user, and the virtual representation corresponds to the first token. In another embodiment, the method further includes a step obtaining the first sensor data via a microphone (and speaker) associated with the first computing device. In such cases, the first sensor data includes an audio stream corresponding to the first token.

Other methods can also be contemplated within the scope of this disclosure. For example, method for adjusting a configuration of an application in response to device data is disclosed. The method includes a first step of obtaining first image data from a first computing device associated with a first user account during a first access session, where the first image data includes a virtual representation of a first real-world object. For example, the object is located in proximity to the first computing device. A second step includes classifying the virtual representation as a first token for a first microlocation, and a third step includes obtaining second image data during a second access session from a second computing device associated with the first user account. In addition, the method includes a fourth step of determining the second image data includes the first token. A fifth step includes automatically adjusting the configuration of the application from a first mode to a second mode in response to the second image data including the first token.

In different embodiments, this method may include additional steps or aspects. In one embodiment, the method also involves steps of linking the first token to the first user account, and storing the first token in a database associated with the application. In some embodiments, the method further includes steps of obtaining third image data during the second access session, determining the third image data includes a second token, and automatically reverting the configuration of the application from the second mode to the first mode in response to the third image data including the second token.

In another example, the first mode enables audio output from the application and the second mode disables audio output from the application. In some embodiments, the first mode enables the application to emit audio at full volume and the second mode reduces the audio volume. In one embodiment, the first mode enables the display of sensitive information and the second mode disables the display of sensitive information.

In some embodiments, the method can also include steps of determining, at a second time subsequent to the first time, that use of the application by the first user has a high likelihood of including the second in-app activity when the first contextual data is detected, removing the link between the first contextual data and the first in-app activity, linking the first contextual data to the second in-app activity, and presenting, during a fourth user session in which the first contextual data is detected, a modified main interface comprising the second layout.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for adjusting a configuration of an application in response to device data, the method comprising:
    enrolling each of a first token, a second token, and a third token by associating first enrollment sensor data, second enrollment sensor data, and third enrollment sensor data from a sensor associated with a first computing device with each of a first microlocation, a second microlocation, and a third microlocation;

associating the first token and the first microlocation with a first application mode;

associating the second token and the second microlocation with a second application mode, the second application mode being different from the first application mode;

associating the third token and the third microlocation with a third application mode, the third application mode being different from both of the first application mode and the second application mode;

receiving, during an application usage session, at least first sensor data from the sensor associated with the first computing device;

detecting one of the first token, the second token, or the third token in the first sensor data; and automatically adjusting, during the application access session, a configuration of the application to one of the first application mode, the second application mode, or the third application mode in response to detecting one of the first token, the second token, or the third token in the first sensor data;

wherein obtaining the first sensor data occurs via a camera associated with the first computing device, the first sensor data including a virtual representation of a first real-world object that is located in proximity to the first user, the virtual representation corresponding to the first token.

2. The method of claim 1, wherein the first sensor data is one of image data and audio data.

3. The method of claim 1, wherein each of the first application mode, the second application mode, and the third application mode are associated with different audio output settings from the application, wherein the first application mode enables audio output from the application and the second application mode disables audio output from the application.

4. The method of claim 3, wherein the second application mode enables closed captioning for the application.

5. The method of claim 1, wherein each of the first application mode, the second application mode, and the third application mode are associated with different video playback settings from the application, wherein the first application mode enables video playback from the application and the second application mode disables video playback from the application.

6. The method of claim 1, further comprising obtaining the first sensor data via a microphone associated with the first computing device, the first sensor data including an audio stream corresponding to the first token.

7. A method for adjusting a configuration of an application in response to device data, the method comprising:

obtaining first image data from a first computing device associated with a first user account during a first access session, the first image data including a first virtual representation of a first real-world object;

classifying the first virtual representation as a first token for a first microlocation;

associating the first token and the first microlocation with a first application mode;

obtaining second image data from the first computing device during the first access session, the second image data including a second virtual representation of a second real-world object;

classifying the second virtual representation as a second token for a second microlocation;

associating the second token and the second microlocation with a second application mode;

obtaining third image data from the first computing device during the first access session, the third image data including a third virtual representation of a third real-world object;

classifying the third virtual representation as a third token for a third microlocation;

associating the third token and the third microlocation with a third application mode;

obtaining in-use image data during a second access session from a second computing device associated with the first user account;

determining the in-use image data includes the first token, the second token, or the third token; and automatically adjusting a configuration of the application to one of the first application mode, the second application mode, or the third application mode in response to determining that the in-use data includes one of the first token, the second token, or the third token;

wherein obtaining the first sensor data occurs via a camera associated with the first computing device, the first sensor data including a virtual representation of a first real-world object that is located in proximity to the first user, the virtual representation corresponding to the first token.

8. The method of claim 7, further comprising:

linking each of the first token, the second token, and the third token to the first user account; and storing each of the first token, the second token, and the third token in a database associated with the application.

9. The method of claim 7, further comprising:

receiving a user selection regarding one of the first application mode, the second application mode, and the third application mode after the second access session has occurred in one of the first microlocation, the second microlocation, or the third microlocation that updates the one of the first application mode, the second application mode, and the third application mode such that subsequent access sessions recall an updated version of the one of the first application mode, the second application mode, and the third application mode.

10. The method of claim 7, wherein each of the first application mode, the second application mode, and the third application mode are associated with different audio output settings from the application, wherein the first application mode enables audio output from the application and the second application mode disables audio output from the application.

11. The method of claim 7, wherein each of the first application mode, the second application mode, and the third application mode are associated with different audio output settings from the application, wherein the first application mode enables the application to emit audio at full volume and the second application mode reduces the audio volume.

12. The method of claim 7, wherein the first application mode enables the display of sensitive information and the second application mode disables the display of sensitive information.

13. A system for adjusting a configuration of an application in response to device data, the system comprising a processor and machine-readable media including instructions which, when executed by the processor, cause the processor to:
> enroll each of a first token, a second token, and a third token by associating first enrollment sensor data, second enrollment sensor data, and third enrollment sensor data from a sensor associated with a first computing device with each of a first microlocation, a second microlocation, and a third microlocation;
> associate the first token and the first microlocation with a first application mode;
> associate the second token and the second microlocation with a second application mode, the second application mode being different from the first application mode;
> associate the third token and the third microlocation with a third application mode, the third application mode being different from both of the first application mode and the second application mode;
> receive, during an application usage session, at least first sensor data from the sensor associated with the first computing device associated with a first user;
> detect one of the first token, the second token, or the third token in the first sensor data; and
> automatically adjust, during the application access session, a configuration of the application to one of the first application mode, the second application mode, or the third application mode in response to detecting of the first token, the second token, or the third token in the first data;

wherein the instructions further cause the processor to obtain the first sensor data via a camera associated with the first computing device, the first sensor data including a virtual representation of a first real-world object that is located in proximity to the first user, the virtual representation corresponding to the first token.

14. The system of claim 13, wherein the first sensor data is one of image data and audio data.

15. The system of claim 13, wherein each of the first application mode, the second application mode, and the third application mode are associated with different audio output settings from the application, wherein the first application mode enables audio output from the application and the second application mode disables audio output from the application.

16. The system of claim 15, wherein the second application mode enables closed captioning for the application.

17. The system of claim 13, wherein each of the first application mode, the second application mode, and the third application mode are associated with different video output settings from the application, wherein the first application mode enables video playback from the application and the second application mode disables video playback from the application.

18. The system of claim 13, wherein the instructions further cause the processor to obtain the first sensor data via a microphone associated with the first computing device, the first sensor data including an audio stream corresponding to the first token.

* * * * *